Patented Aug. 24, 1954

2,687,377

UNITED STATES PATENT OFFICE 2,687,377

LUBRICANT

William T. Stewart and Alfred Goldschmidt, El Cerrito, and Oliver L. Harle, Berkeley, Calif., assignors to California Research Corporation, San Francisco, Calif., a corporation of Delaware No Drawing. Application December 11, 1951,
Serial No. 261,141

3 Claims. (Cl. 252—51.5)

The present invention relates to the preparation of novel and superior lubricating oil compositions. More particularly, the invention has to do with the preparation of lubricating oil compositions based on polyoxyalkylene polymeric material having improved stability toward oxidative deterioration.

Polymeric mixtures having the polymeric structural configuration,

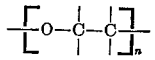

have hitherto been proposed as synthetic lubricants. These materials are prepared from the alkylene oxides, such as ethylene oxide, 1,2-propylene oxide, the 1,2-butylene oxides and higher homologs and mixtures thereof, and the corresponding alkylene glycols. The resulting products may be polyoxyalkylene diols or polyalkylene glycol derivatives in which one or both of the terminal hydroxyl groups have been removed either during the polymerization reaction or subsequently thereto, as by etherification or esterification, to yield mono- or di-ether or mono- or di-ester groups, or combinations of such terminal groups, whereby certain desirable properties are imparted to the final polymeric mixture.

By way of illustration, U. S. Patent No. 2,448,664 describes the preparation of a polyoxypropylene polymeric mixture according to the equation

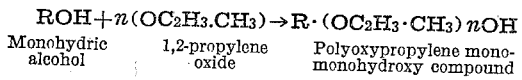

| Monohydric alcohol | 1,2-propylene oxide | Polyoxypropylene monomonohydroxy compound |

Other patents cover polyoxypropylene derivatives of the foregoing monohydroxy compound in which the terminal hydroxyl group has been etherified or esterified. These materials are alleged to be useful as synthetic lubricants.

Although polymeric compounds prepared from the above-mentioned epoxides and glycols have certain desirable properties, such as good viscosity indices, they possess the serious drawback of being highly sensitive to oxidation. Upon oxidation these polymeric materials depolymerize, with consequent loss in viscosity, to form undesirable acidic compounds and volatile materials, which latter materials are eventually lost from the lubrication system.

An object of the invention is to impart oxidative stability to polymeric mixtures prepared from alkylene oxides or glycols.

Another object of the invention is to prepare novel and superior lubricating oil compositions.

Other objects and advantages of the invention will be apparent from the ensuing description of the invention.

The invention is predicated on the discovery that polymeric material of the type hereinabove described may substantially be made more resistant against oxidation by the incorporation therein of certain specific classes of amine compounds, one class acting as a primary inhibitor, another, as a secondary inhibitor, or as an activator for said primary inhibitor. The results are unexpected in view of the fact that the secondary inhibitor or activator by itself has no antioxidant effect on polyalkylene glycol polymeric material, but when used conjointly with the primary inhibitor greatly enhances or activates the antioxidant properties of the primary inhibitor.

More specifically, the primary inhibiting amine compound is an aromatic diaryl amine, for example, diphenylamine, which may be represented by the formula

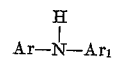

wherein Ar and Ar₁ represent like or different aryl groups, such as phenyl, naphthyl, or anthryl radicals. Also suitable are substituted diarylamines, that is, darylamine having substituent groups or radicals on the aryl or ring portion of the molecule, with, preferably, the ortho or para position in respect to the nitrogen in at least one ring or aryl group being free. The substituent groups can be amino, hydroxyl, mercapto, alkoxy, aryloxy, thio, alkyl, aryl, alkaryl and arylalkyl radicals. Substituent groups containing oxygen which are acidic or acid strengthening in nature and which are not further oxidizable, such as nitro, sulfonic acid, and carboxyl radicals are less desirable and for practical purposes are avoided. Moreover, the aromatic diaryl amine compound is one that is soluble in the polyalkylene glycol polymeric material to the extent of at least 0.25%, and preferably at least 0.5% by weight of said polymeric material.

Examples of primary inhibiting amine compounds are phenyl-α-naphthylamine, p-hydroxy diphenylamine, diphenyl-p-phenylene diamine, diphenylamine, phenothiazine, di-β-naphthylamine, p-isopropoxy diphenylamine, phenyl-β-naphthylamine, di(p-isopropylphenyl) p-phenylene diamine, di-β-naphthyl-p-phenylene diamine, and p,p'-diisooctyl diphenylamine.

The secondary inhibiting amine compound, or activator for the primary inhibitor, is an aliphatic amine and can be regarded as the condensation product or products of an α-hydroxy alkylamine, for example, ethanolamine or isopropanolamine, and/or an alkylene diamine, for example, ethylene diamine or 1,2-propylene diamine. The condensation product or products can be of straight, cyclic or branched chain structure. Preferably employed in accordance with the invention is a secondary inhibiting amine condensation product having at least one free amino hydrogen or hydroxyl radical in the molecule. Substituent groups, such as alkyl, aryl, alkaryl and arylalkyl radicals on the nitrogen are therefore not precluded, although as hereinabove indicated it is preferred to have at least one free amino hydrogen or free hydroxyl radical in the molecule.

The condensation products contemplated by the invention may be illustrated by the following equations:

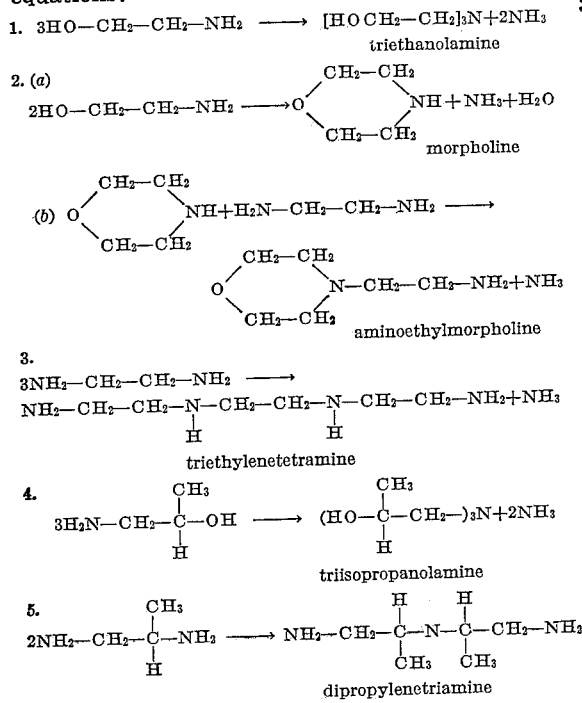

The secondary inhibiting amine compound is preferably one having a molecular weight of at least 125 and is soluble in the polyalkylene glycol polymeric material to the extent of at least 0.25%, preferably at least 0.5%, by weight of said polymeric materials. Examples of suitable secondary inhibiting amines are tetraethylenepentamine, polyethylene diamine (average molecular weight 1400), aminoethylmorpholine, triethanolamine, triethanolamine tristearate, $N^1,N^5$-dioleoyl tetraethylenepentamine, hydroxy ethyl-diethylenetriamine, N,N-di(aminoethyl) aniline, N - phenyl diethanolamine, $N^1,N^5$ - di(2-ethylhexyl) tetraethylenepentamine, triisopropanolamine, and dipropylenetriamine.

In general, the amount of aromatic primary inhibiting amine required for the substantial inhibition of oxidative deterioration of polyalkylene glycol polymeric material ranges from about 0.1% to 5% by weight of the finished oil, with a working range of about 0.2% to 2% and an optimum of 0.5% by weight of the finished oil. The secondary inhibiting amine, or activator, resides within the range of about 0.5% to 10%, and most advantageously from 1% to 3%, generally about 2%, by weight of the finished oil.

The polymeric materials contemplated by the present invention may be prepared according to conventional methods. For example, U. S. Patent No. 2,448,664 describes the preparation of polyoxypropylene monohydroxy compounds by the addition of 1,2-propylene oxide to a monohydroxy aliphatic alcohol to produce a polymeric mixture of lubricating oil viscosity ranging in molecular weight from around 500 up to 2,000 and higher. The preparation of copolymeric polyalkylene oxide mixtures from ethylene oxide and propylene oxide are described in U. S. Patent No. 2,425,755. Polyoxyalkylene diols are described in U. S. Patent No. 2,480,185, while diethers of polyoxyalkylene diols are taught in U. S. Patent No. 2,520,614. Preferably employed in accordance with the invention is the diether of polyalkylene glycol or the monoether of polyalkylene glycol ester, derived most advantageously from 1,2-propylene oxide.

A convenient method of measuring the resistance to oxidation possessed by the compositions prepared in accordance with the invention is the use of the apparatus and procedure described in Industrial and Engineering Chemistry, vol. 28, p. 26 (1936), wherein the rate of oxygen absorbed at constant pressure by a definite weight of oil is regarded as a measure of the oxidative stability of the oil. According to this procedure, the oil sample is placed in an absorption cell, provided in the bottom with a fine fritted-glass filter to disperse the oxygen stream, circulating through the system at a constant rate, into fine bubbles. In obtaining the data hereinbelow appearing, the following modified apparatus and procedure were employed:

The oxidation or absorption cell is constructed of a large glass tube with the head portion having a connection for introducing oxygen, an annular space surrounding the upper end of the tube and a fitting for a removable high speed glass stirrer. The annular space contains potassium hydroxide pellets for the removal of water, carbon dioxide, volatile aldehydes, etc. The lower portion of the cell which contains the tested sample is immersed in an oil bath at a temperature of about 340° F. During the test, the oil sample is rapidly agitated by means of a high speed stirrer and is kept under a pressure of about 1 atmosphere of pure oxygen, the volume of oxygen added being automatically recorded. The time in hours required for 100 grams of oil to absorb 1200 cc. of oxygen is called the "induction period" (I. P.), and represents the point at which the sample begins to absorb oxygen or oxidize.

The following tabulated data were obtained from a number of experiments performed in accordance with the test above described.

In Table I a number of secondary inhibiting amine compounds are exemplified in combination with the primary inhibiting amine compound phenyl-α-naphthylamine, employed in an amount of 0.5%. Where otherwise not indicated by amounts appearing after the designated secondary inhibiting amine compound, the secondary inhibiting amine compound or activator was used in amounts of 1%. In all instances the polyalkylene glycol polymeric material was one prepared from 1,2-propylene oxide and 2-ethylhexanol, the said polymeric material having a molecular weight of about 1000. The degree of oxidative stability of each combination appears as the induction period (I. P.) in hours at 340° F.

TABLE I

*Effect of aromatic amine primary inhibitor with inhibitor activators*

| Activator (1% in Polypropylene Glycol 2-ethylhexyl monoether, M. W. about 1000) | With 0.5% Phenyl-α-Naphthylamine (I. P., Hrs. at 340° F.) |
|---|---|
| None | 1.2 |
| Tetraethylenepentamine | 4.8 |
| Triisopropanolamine | 2.5 |
| Ethylene diamine condensation product (M. W. about 1,000) | 6.1 |
| Aminoethylmorpholine | 4.8 |
| Triethanolamine | 4.3 |
| Dipropylenetriamine | 2.9 |
| Aminoethylethanolamine | 3.2 |
| Hydroxyethyldiethylenetriamine | 3.0 |
| N¹,N⁵-dioleoyltetraethylenepentamine (4%) | 4.2 |
| Triethanolamine tristearate (6.5%) | 4.5 |

Further illustrative of the invention, polypropylene diol polmeric material was prepared employing 1,2-propylene oxide and water to initiate the polymerization reaction, the polymeric material having a molecular weight of about 600. Addition of 0.5% phenyl-α-naphthylamine resulted in a composition having an induction period of only 1.5 hours. Addition of both 0.5% phenyl-α-naphthylamine and 1% of aminoethylmorpholine to another portion of the same polymeric material resulted in a composition having an induction period of 5.5 hours.

As a further example of the invention, a copolymer of ethylene oxide and 1,2-propylene oxide was prepared employing 25 mol per cent ethylene oxide and 75 mol per cent 1,2-propylene oxide, and 2-ethylhexanol as the reaction initiator, the final polymer having a molecular weight of about 800. Addition of 0.5% phenyl-α-naphthylamine and 1% of aminoethylmorpholine to this polymer resulted in a composition having an induction period of 7.3 hours. Omission of aminoethylmorpholine results in a composition having an induction period of only three hours.

Another example of the invention is as follows: A secondary butyl methyl polypropylene glycol diether having a molecular weight of about 600 was treated with 0.5% phenyl-α-napthylamine and 1% aminoethylmorpholine. The induction period of the final composition was 3.5 hours. In the absence of aminoethylmorpholine, the induction period was only one hour.

Still another example of the invention is as follows: A trimethylene glycol polymer having a molecular weight of about 800 was treated with 0.5% phenyl-α-naphthylamine and 1% aminoethylmorpholine. The final composition had an induction period of 12.0 as compared with an induction period of 5.2 hours when the aminoethylmorpholine is omitted from the composition.

In all cases, the use of the activating material alone, in the absence of phenyl-α-naphthylamine, gave no inhibition.

In Table II there are tabulated the data obtained from combinations of different primary inhibiting compounds with the activator aminoethylmorpholine. The polymeric material was the same as that employed in Table I, and the numerals have the same significance as in Table I.

TABLE II

*Effect of inhibitor activator with aromatic amine primary inhibitors*

| Aromatic Amine Inhibitor 1% in Polypropylene Glycol 2-ethylhexyl monoether (M. W. about 1,000) | I. P. (Hr. at 340° F.) | |
|---|---|---|
| | With 1% Aminoethylmorpholine | Without Activator |
| Ortho-Aminophenol | 1.8 | 1.7 |
| Hydroxydiphenylamine (9.5%) | 9.3 | 3.2 |
| Phenothiazine (0.5%) | 10.3 | 7.6 |
| Diphenylamine | 2.2 | 1.2 |
| Dodecylaniline | 0.0 | 0.0 |
| 3-Pentadecyl-4-aminophenol | 2.0 | 1.8 |
| α-Napthylamine | 1.5 | 1.4 |
| Phenyl-α-naphthylamine (0.5%) | 4.8 | 1.4 |

It will be noted from inspection of the above table that aromatic amine primary inhibitors falling outside the class defined herein, are not improved by the use of activating material. These are illustrated by the monoaryl amines, ortho-aminophenol, dodecylaniline, and α-naphthylamine.

Compositions prepared in accordance with the invention are useful as crankcase lubricants, hydraulic fluids, turbine oils, instrument oils, ice machine oils, constituent oil in grease manufacture, etc.

Obviously many modifications and variations of the invention, as hereinbefore set forth, may be made without departing from the spirit and scope thereof, and therefore, only such limitations should be imposed as are indicated in the appended claims.

We claim:

1. A lubricant composition which comprises a major portion of polyalkylene glycol polymeric material of lubricating oil viscosity which is susceptible to oxidative deterioraton, together with from about 0.1 to 5 per cent, by weight, of a diarylamine selected from the group consisting of phenyl-α-naphthylamine, p-hydroxydiphenylamine, diphenyl-p-phenylene diamine, diphenylamine, phenothiazine, di - β - naphthylamine, p - isopropoxy diphenylamine, phenyl - β - naphthylamine, di(p - isopropylphenyl)p - phenylene diamine, di-β-naphthyl-p-phenylene diamine, and p,p'-diisooctyl diphenylamine, and from about 0.5 to 10 per cent, by weight, of an aliphatic amine selected from the group consisting of tetraethylenepentamine, triisopropanolamine, polyethylene diamine, aminoethylmorpholine, triethanolamine, dipropylenetriamine, aminoethylethanolamine, hydroxyethyldiethylenetriamine, N¹,N⁵ - dioleoyltetraethylenepentamine, and triethanolamine tristearate, said diarylamine and said aliphatic amine each being soluble in said polyalkylene glycol polymeric material to the extent of at least 0.25 per cent, by weight.

2. The composition of claim 1 wherein the polyalkylene glycol polymeric material is a 1,2-polyalkylene glycol polymer wherein at least one of the end groups is an alkoxy group.

3. The composition of claim 1 wherein the polyalkylene glycol polymeric material is a 1,2-polyalkylene glycol polymer wherein at least one of the end groups is an alkoxy group, and wherein the diarylamine is phenyl-α-naphthylamine and the aliphatic amine is aminoethylmorpholine.

References Cited in the file of this patent

UNITED STATES PATENTS

| Number | Name | Date |
|---|---|---|
| 2,448,664 | Fife et al. | Sept. 7, 1948 |
| 2,481,278 | Ballard et al. | Sept. 6, 1949 |
| 2,522,155 | Ballard et al. | Sept. 12, 1950 |

FOREIGN PATENTS

| Number | Country | Date |
|---|---|---|
| 425,728 | Great Britain | Mar. 20, 1935 |
| 601,419 | Great Britain | May 5, 1948 |